US009251121B2

(12) United States Patent
Gellaboina et al.

(10) Patent No.: US 9,251,121 B2
(45) Date of Patent: Feb. 2, 2016

(54) DETERMINING PUSHBACK DIRECTION (71) Applicant: Honeywell International Inc., Morristown, NJ (US)

(72) Inventors: Mahesh Kumar Gellaboina, Kurnool (IN); Dhananjayan S, Chennai (IN); Gurumurthy Swaminathan, Bangalore (IN); Mohammed Ibrahim Mohideen, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 406 days.

(21) Appl. No.: 13/683,871

(22) Filed: Nov. 21, 2012

(65) Prior Publication Data
US 2014/0142907 A1 May 22, 2014

(51) Int. Cl.
*G06K 9/00* (2006.01)
*G06F 17/10* (2006.01)
*G06T 7/20* (2006.01)

(52) U.S. Cl.
CPC .. *G06F 17/10* (2013.01); *G06T 7/20* (2013.01)

(58) Field of Classification Search
None
See application file for complete search history.

(56) References Cited

U.S. PATENT DOCUMENTS

| 7,778,466 B1* | 8/2010 | Medasani et al. | 382/199 |
| 2003/0086496 A1* | 5/2003 | Zhang et al. | 375/240.16 |
| 2006/0178830 A1* | 8/2006 | Sherony | 701/301 |
| 2007/0067093 A1* | 3/2007 | Pepitone | 701/120 |
| 2008/0270569 A1* | 10/2008 | McBride et al. | 709/217 |
| 2010/0119112 A1* | 5/2010 | Helfman et al. | 382/103 |
| 2010/0150403 A1* | 6/2010 | Cavallaro et al. | 382/107 |
| 2011/0081082 A1* | 4/2011 | Jiang et al. | 382/170 |
| 2012/0082381 A1* | 4/2012 | Maki et al. | 382/170 |
| 2012/0263346 A1* | 10/2012 | Datta et al. | 382/103 |
| 2013/0016877 A1* | 1/2013 | Feris et al. | 382/103 |
| 2014/0003724 A1* | 1/2014 | Feris et al. | 382/197 |

OTHER PUBLICATIONS

Feris, Rogerio, Behjat Siddiquie, Yun Zhai, James Petterson, Lisa Brown, and Sharath Pankanti. "Attribute-based vehicle search in crowded surveillance videos." In Proceedings of the 1st ACM International Conference on Multimedia Retrieval, p. 18. ACM, 2011.*
Heeger, David J. "Optical flow using spatiotemporal filters." International Journal of Computer Vision 1, No. 4 (1988): 279-302.*
Tian, Ying-Li, and Arun Hampapur. "Robust salient motion detection with complex background for real-time video surveillance." In Application of Computer Vision, 2005. WACV/MOTIONS'05 vol. 1. Seventh IEEE Workshops on, vol. 2, pp. 30-35. IEEE, 2005.*

(Continued)

*Primary Examiner* — Sumati Lefkowitz
*Assistant Examiner* — Carol Wang
(74) *Attorney, Agent, or Firm* — Brooks, Cameron & Huebsch, PLLC (57) ABSTRACT Devices, methods, and systems for determining pushback direction are described herein. One method includes receiving a video image of an aircraft during a pushback of the aircraft, determining a motion flow map associated with the video image during the pushback, determining a motion orientation histogram associated with the video image during the pushback, and determining a direction of the pushback based on the motion flow map and the motion orientation histogram.

19 Claims, 4 Drawing Sheets (56) References Cited

OTHER PUBLICATIONS

Sotelo, M. A., J. Barriga, David Fernández, Ignacio Parra, José Eugenio Naranjo, Marta Marrón, Sergio Alvarez, and Miguel Gavilán. "Vision-based blind spot detection using optical flow." In Computer Aided Systems Theory—EUROCAST 2007, pp. 1113-1118. Springer Berlin Heidelberg, 2007.*

Tran, Du, and Alexander Sorokin. "Human activity recognition with metric learning." In Computer Vision—ECCV 2008, pp. 548-561. Springer Berlin Heidelberg, 2008.*

Cutler, Ross, and Matthew Turk. "View-Based Interpretation of Real-Time Optical Flow for Gesture Recognition." In Proceedings of the 3rd. International Conference on Face & Gesture Recognition, p. 416. IEEE Computer Society, 1998.*

* cited by examiner

DETERMINING PUSHBACK DIRECTION

TECHNICAL FIELD

The present disclosure relates to devices, methods, and systems for determining pushback direction.

BACKGROUND

In various airports, aircraft (e.g., airplanes) can undergo a pushback. A pushback can include, for example, the aircraft being moved (e.g., pushed and/or pulled) from a terminal gate (e.g., using external power). A pushback can include the aircraft being aligned towards a taxiway leading to a designated runway prior to departure, for instance. Aircraft pushback can be accomplished using various devices (e.g., tractors, tugs, trucks, etc.) and/or airport personnel (e.g., air traffic controller(s) (ATCs), ground crew(s), etc.).

A pushback strategy under previous approaches may include an aircraft crew (e.g., pilot(s)) receiving clearance information from an ATC and thereafter requesting a pushback in a particular direction (e.g., specified by the ATC) to ground crew(s). Ground crew personnel, in a tug truck, for instance, may respond to aircraft crew using a radio in the truck. In various airport scenarios, however, ATC and ground crews may not be able to directly communicate with each other and/or may use different communication frequencies, for instance.

Miscommunication under previous approaches may yield an incorrect (e.g., unintended and/or off-target) direction of aircraft pushback. An incorrect direction of pushback may pose safety risks to passengers and/or personnel. For example, an aircraft may move towards other (e.g., arriving, departing, taxiing and/or parked) aircraft due to an incorrect pushback direction. Monetary costs associated with collisions and/or flight delays, for instance, may additionally be incurred due to incorrect pushback directions.

DETAILED DESCRIPTION

Devices, methods, and systems for determining pushback direction are described herein. For example, one or more embodiments include receiving a video image of an aircraft during a pushback of the aircraft, determining a motion flow map associated with the video image during the pushback, determining a motion orientation histogram associated with the video image during the pushback, and determining a direction of the pushback based on the motion flow map and the motion orientation histogram.

Determining pushback direction in accordance with one or more embodiments of the present disclosure can reduce safety risks and/or costs associated with miscommunication between airport personnel. Accordingly, embodiments of the present disclosure can increase security and/or efficiency of airports. Determining pushback direction in accordance with one or more embodiments of the present disclosure can include fusing dominant global orientation direction information with stable motion flow blob information obtained, for instance, from optical flow vectors associated with a video.

Embodiments of the present disclosure can be implemented using existing installations (e.g., imaging devices) at airports. Additionally, embodiments of the present disclosure can be used to automate existing pushback strategies and/or provide various notifications to airport personnel in instances of incorrect pushback direction, for instance.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of optical flow vectors" can refer to one or more optical flow vectors.

Figure 1:
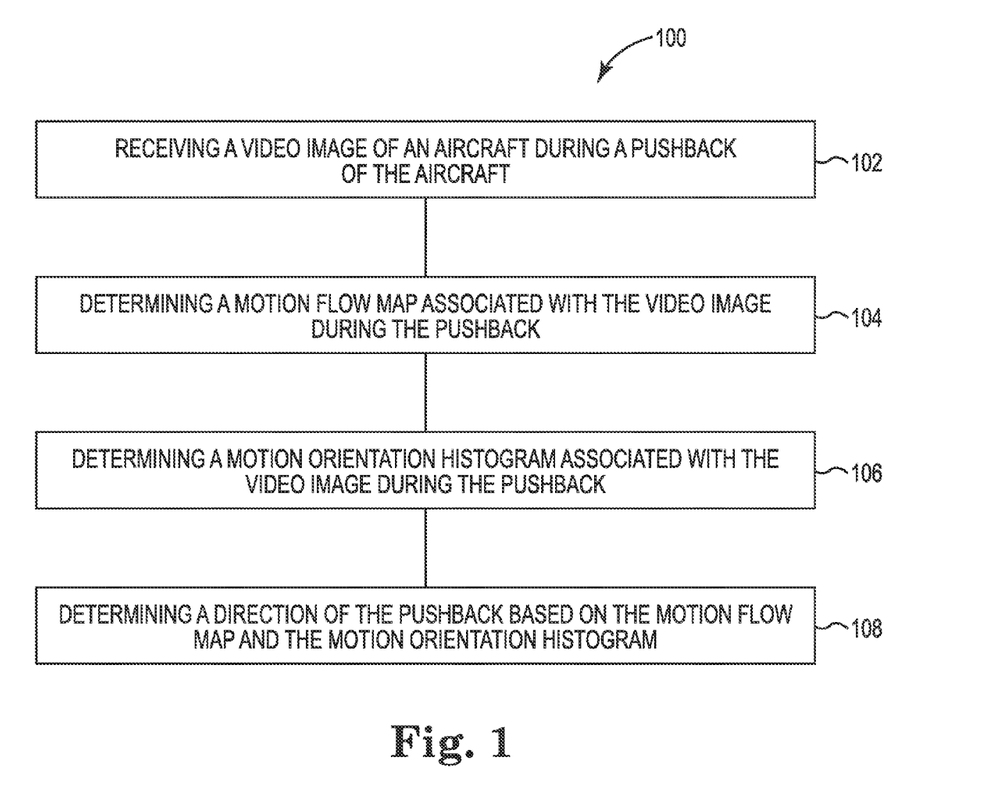
FIG. 1 illustrates a method for determining pushback direction accordance with one or more embodiments of the present disclosure.

FIG. 1 illustrates a method 100 for determining pushback direction in accordance with one or more embodiments of the present disclosure. Method 100 can be performed by a computing device, for example, such as computing device 212, further described below in connection with FIG. 2.

At block 102, method 100 includes receiving a video image of an aircraft during a pushback of the aircraft. As referred to generally herein, "video" may be used interchangeably with "video image." As used herein, a "pushback" can refer to the aircraft being moved (e.g., pushed and/or pulled) from a terminal gate (e.g., using external power). A pushback can include the aircraft being aligned towards a taxiway leading to a designated runway prior to departure, for instance. Aircraft pushback can be accomplished using various devices (e.g., tractors, tugs, trucks, etc.) and/or airport personnel (e.g., air traffic controller(s) (ATCs), ground crew(s), etc.). Videos in accordance with embodiments of the present disclosure are not limited to particular types and/or qualities.

Videos can be received as they are being captured (e.g., in real time) by one or more imaging devices (e.g., video cameras). Imaging devices in accordance with embodiments of the present disclosure are not limited to particular types, makes, models, etc. Imaging devices may be fixed in place (e.g., mounted), for instance. Videos can be received by a number of computing devices via a communicative coupling enabling wired and/or wireless communication in various directions between the computing device(s) and imaging device(s).

Receiving a video can include receiving the video on a number of pixels (e.g., a display). Receiving a video can include receiving a number of frames and/or images of a video. For example, receiving a video can include receiving a first (e.g., initial) frame of the video and/or or a subsequent frame of the video.

At block 104, method 100 includes determining a motion flow map associated with the video image during the pushback. Determining a motion flow map can include executing instructions, stored on a computer-readable medium, for instance, to determine a number of optical flow vectors (e.g., optical flow field vectors) associated with the video image.

Considering an image at time t as $I_t$, a number of optical flow vectors can be determined by comparing $I_t$ with $I_{t-1}$. For example, a one dimensional signal can be represented in terms of a second order polynomial by:

$$f(x) = x^T A_1 x + b^T x + c_1.$$

A can be a symmetric matrix, b can be a vector, and c can be a scalar, for instance. In instances of two signals, a constraint equation for determining a displacement field, d(x), can be formulated by:

$$A(x)d(x) = \Delta b(x),$$

where A(x) can denote a mean of a symmetry matrix of the two signals, $$A(x) = \frac{A_1(x) + A_2(x)}{2},$$

and $\Delta b(x)$ can denote a change in vectors, $$\Delta b(x) = -\frac{1}{2}(b_2(x) - b_1(x)).$$

Accordingly, determining spatially varying displacement vectors over a particular neighborhood can include determining a particular solution to (e.g., minimizing):

$$\sum_{\Delta x \in I} w(\Delta x) \|A(x + \Delta x)d(x) - \Delta b(x + \Delta x)\|^2.$$

In the above, $w(\Delta x)$ can be a Gaussian weight function applied over the particular neighborhood. To determine various (e.g., larger) displacements, embodiments of the present disclosure may use a coarse-to-fine multi-scale approach, where, for instance, the polynomial expansion coefficients may be recomputed for each sub-sampled scale. Such conditions and/or constraints may additionally apply in two-dimensional instances, such as images, for example.

Embodiments of the present disclosure can determine a number of optical flow vectors associated a particular (e.g., current) frame with respect to a previous frame using the constraints previously discussed.

Embodiments may designate and/or select values (e.g., appropriate values) associated with various parameters such as pyramidal decomposition size, number of scales, Gaussian weight window size, number of polynomials, and/or sigma (σ), among others. For example, some embodiments may select a Gaussian window size of approximately 15 to accommodate a particular (e.g., large) displacement.

The optical flow vectors, once determined, can be used to generate (e.g., determine) a motion flow of the field. The optical flow vectors can be assigned directions (e.g., positive or negative) based upon a direction in which they are each oriented from a corresponding pixel (e.g., in the previous frame).

For example, a positive flow vector can indicate that the pixel motion occurred to the right of the image with respect to the previous frame, and a negative flow vector can indicate that the pixel motion occurred to the left of the image with respect to the previous frame. A mapping of the positive and negative flow vectors determined from the optical flow vectors may be referred to generally herein as a "motion flow map" (e.g., a two-dimensional graph visually representing temporal connection(s) between corresponding pixels of an image). A motion flow map can include a first portion of the plurality of optical flow vectors oriented in a first direction (e.g., positive and/or right), and a second portion of the plurality of optical flow vectors oriented in a second direction (e.g., negative and/or left).

In various embodiments, a subset of a number of pixels (e.g., a portion of a total number of pixels) may be used in generating a motion flow map. For example, embodiments of the present disclosure may use 1 in 4 pixels in generating a motion flow map. Such embodiments may increase computational tractability over those using higher numbers of pixels, for instance. In some embodiments, positive fields and negative fields may be displayed in a plurality of channels as a first color (e.g., green) and a second color (e.g., red), respectively. In some embodiments, the positive and negative flow maps can be respectively stored as a first channel of the motion flow map and a second channel of the motion flow map (e.g., an R channel and a G channel, respectively, of a single Null B channel RGB image).

Embodiments of the present disclosure can determine motion flow maps using numbers of frames in excess of two. That is, motion history of an object can be accumulated over a particular time period. For example, extracting salient motion of an object in a video may include considering spatio-temporal relationships of the object in a sequence of N frames. Such relationships can be determined by, for example, embedding past consecutive temporal information obtained from the motion flow map (discussed above) in a particular (e.g., current) frame by:

$$f(x) = \begin{cases} \bigcup_{i=t}^{t-m} \tau F_i, & 0 \leq i \leq m \\ 0, & \text{otherwise,} \end{cases}$$

where τ and m can be decay function and buffer size, respectively.

Buffer size can be selected and/or set based on object speed (e.g., pushback speed determined based on historical pushback information). For example, if buffer size is set at a first (e.g., high) level, increased level(s) of motion may be determined; if buffer size is set at a second (e.g., low) level, decreased (e.g., zero) levels of motion may be determined. Embodiments may include setting such a buffer size between such levels.

As motion history is accumulated over the particular time period, particular pixels may be brighter than others. Such pixels can be considered "salient" pixels in that may indicate stable scene flow information, structures, and/or regions (sometimes generally referred to herein as "blobs"). In order to segment (e.g., filter) such pixels out, a threshold operation can be performed on the positive and negative channel frames separately. Prior to such a threshold step, various high-frequency (e.g., "noise") pixels can be removed by convolving a weighted Gaussian kernel with a down-sampled map and then up-sampling back to an original size. The Gaussian-based kernel can preserve the actual flow map structures (blobs) while, for example, diffusing various "noises" locally within the structure region. Accordingly, the resulting motion flow map can exhibit increased density and/or include connected blobs.

As previously discussed, the threshold operation can be performed on the positive and negative channel frames separately to, for example, isolate particular blobs having threshold intensity (e.g., a particular brightness). For example, half of a maximum measured intensity value can be selected as such a threshold. An Ex- or operation can be performed separately on the positive (e.g., green) channel and the negative (e.g., red) channel of the color flow map to segment the blobs.

As a result, the motion flow map, in various embodiments, can include salient motion information displayed as threshold-exceeding blobs (e.g., green and red blobs). A dilation operation can be performed to strengthen a connectivity between the blobs, for instance (e.g., if they are weakly connected). Accordingly, determining a motion flow map can include executing instructions to group a first portion of the optical flow vectors indicating a positive (e.g., right) direction of pushback over the number of frames into a first (e.g., green) motion blob, and/or executing instructions to group a second portion of the optical flow vectors indicating a negative (e.g., left) direction of pushback over the number of frames a into a second (e.g., red) motion blob.

At block 106, method 100 includes determining a motion orientation histogram associated with the video image during the pushback. The plurality of optical flow vectors determined, for instance, as previously discussed, can be represented in a motion orientation histogram (e.g., rose map). The motion orientation histogram can include an orientation of each of the plurality of optical flow vectors represented by an angle between 0 and 360 degrees, for instance. The angles can be divided into histogram bins (e.g., radial histogram bins) which may be defined by particular angles and/or intervals. Angles and/or intervals associated with histogram bins (e.g., 10 degrees) are not limited herein. A value (e.g., size and/or height) associated with a particular bin can correspond to a count (e.g., amount) of the optical flow vectors oriented at various angles on and/or between the boundaries of the bin. That is, embodiments of the present disclosure can create a second mapping using the optical flow vectors, wherein the second mapping includes a distribution of the plurality of optical flow vectors into a plurality of radial histogram bins.

For example, $f_x$ and $f_y$ can be selected to represent horizontal and vertical flow vector(s) of a pixel, respectively, and the motion orientation histogram can be represented by:

$$H(\theta)_{\theta \in [0,360°]} = xy \times p(\theta = \phi) \forall \phi = \arctan\frac{f_x}{f_y}, 1 \le x \le x_{max}, 1 \le y \le y_{max}.$$

In a manner analogous to the motion flow map, previously discussed, the motion orientation histogram values can be determined for each frame of a video. Such values can be normalized by determining particular values (e.g., minimum and maximum) of the histogram bins, for instance, by:

$$normH = \sum_{x=0°}^{360°} \frac{p(x) - H_{min}}{H_{max} - H_{min}}.$$

As histogram values are determined for each frame, they can be accumulated over a particular time period (e.g., N frames). Accumulation of such values can indicate an actual dominant orientation angle for a sequence of N temporal flow maps. Histogram values can be accumulated by:

$$H_{acc}^t = \frac{normH^t + H_{acc}^{t-1}}{2}$$

The motion orientation histogram can be used to determine an orientation of a global flow vector in various selected frames. Accumulation of motion orientation histograms (e.g., single-frame histogram bin values) can be used to determine an orientation of a temporally dependent global flow.

At block 108, method 100 can include determining a direction of the pushback based on the motion flow map and the motion orientation histogram. Determining the direction of the pushback can include determining a first (e.g., right) confidence factor and/or a second (e.g., left) confidence factor. Such confidence factors can be determined based on a number of parameters including, for instance, a bin ratio in the motion orientation histogram, a pixel count ratio, an X-coordinate of a center of the image, and/or a center of mass ratio (including a zeroth order moment ($m_{00}$) and/or a number of first order moments ($m_{01}$ and $m_{10}$)), among others.

Based on the above parameters, the following equations can be formed for the confidence factor for a first direction of motion (e.g., right) and/or a second direction of motion (e.g., left) with respect to an imaging device.

$$\text{Right Confidence factor} = \alpha C_{green}^{-1}$$

$$\text{Left Confidence factor} = \alpha C_{red}$$

where $\alpha$, $C_{green}$ and $C_{red}$ can represent confidence coefficient, centroid of green blob and centroid of red blob, respectively. A confidence factor associated with a direction of motion can be determined by:

$$\alpha = \frac{\sum_{x=-10*}^{10*} p(x) \sum_{y=0}^{height} \sum_{x=0}^{width} I(x, y, 2)}{\sum_{x=\pi-10*}^{\pi+10*} p(x) \sum_{y=0}^{height} \sum_{x=0}^{width} I(x, y, 1)}$$

$$C_{green} = \frac{\sum_{y=0}^{height} \sum_{x=0}^{width} \arg\max_x I(x, y, 2)}{\sum_{y=0}^{height} \sum_{x=0}^{width} x * \arg\max_x I(x, y, 1)}$$

$$C_{red} = \frac{\sum_{y=0}^{height} \sum_{x=0}^{width} \arg\max_x I(x, y, 1)}{\sum_{y=0}^{height} \sum_{x=0}^{width} x * \arg\max_x I(x, y, 1)}$$

Embodiments of the present disclosure can determine a direction of pushback upon a determination of the confidence factor exceeding a particular threshold. For example, determining the direction of travel can include determining the direction based upon a disappearance of a blob in the motion flow map indicating a first (e.g., right) direction and/or simultaneous stabilization of another blob indicating a second (e.g., left) direction. Stabilization can include a substantially stable determined size and/or brightness of one of the blobs over a particular portion of the number of frames (e.g., a particular time period).

Determining the direction of travel can include stabilization of the motion orientation histogram in a particular configuration over a particular number of frames (e.g., a substantially stable bin ratio indicating a left or right direction of pushback over a particular time period).

Embodiments of the present disclosure can provide various notifications associated with the determined direction of pushback. For example, embodiments of the present disclosure can compare the determined (e.g., actual) direction of pushback to an intended and/or target direction of pushback. If, for instance, those directions do not match, a notification can be provided to ATC personnel, air crews (e.g., pilot(s) and/or ground crews (e.g., ramp controller(s)).

Figure 2:
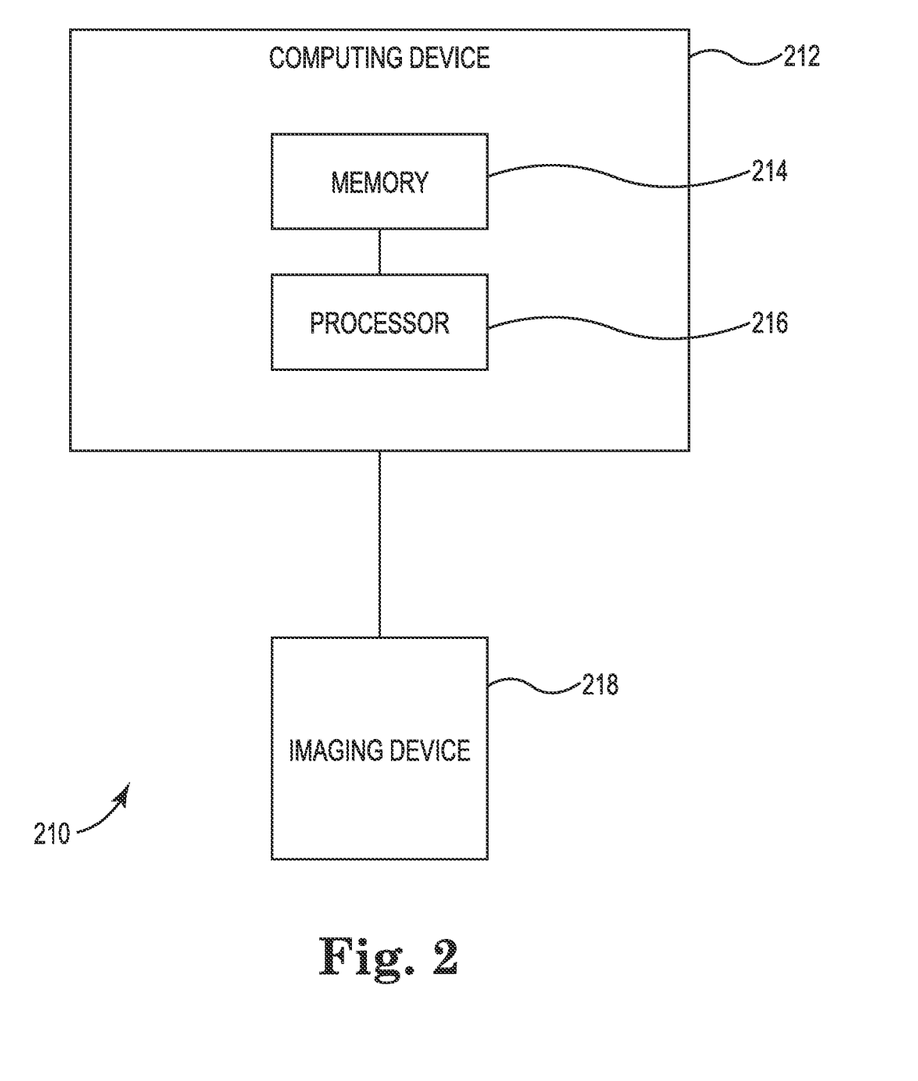
FIG. 2 illustrates a system for determining pushback direction in accordance with one or more embodiments of the present disclosure.

FIG. 2 illustrates a system 210 for determining pushback direction in accordance with one or more embodiments of the present disclosure. As shown in FIG. 2, system 210 can include a computing device 212. Computing device 212 can be, for example, a laptop computer, a desktop computer, or a mobile device (e.g., a mobile phone, a personal digital assistant, etc.), among other types of computing devices.

As shown in FIG. 2, system 210 can include an imaging device 218. Although one imaging device is shown, embodiments of the present disclosure are not limited to a particular number of imaging devices. Imaging device 218 can capture various video images. For example, imaging device 218 can be configured to capture a video image of an aircraft during a pushback of the aircraft. Video images (e.g., videos), captured by imaging device 218, can include video images captured during increased light conditions (e.g., daytime) and/or decreased light conditions (e.g., nighttime).

As shown in FIG. 2, computing device 212 includes a memory 214 and a processor 216 coupled to memory 214. Memory 214 can be any type of storage medium that can be accessed by processor 216 to perform various examples of the present disclosure. For example, memory 214 can be a non-transitory computer readable medium having computer readable instructions (e.g., computer program instructions) stored thereon that are executable by processor 216 to determine a pushback direction in accordance with one or more embodiments of the present disclosure. Method 100, previously discussed in connection with FIG. 1, can be performed by computing device 212, for instance.

Memory 214 can be volatile or nonvolatile memory. Memory 214 can also be removable (e.g., portable) memory, or non-removable (e.g., internal) memory. For example, memory 214 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 214 is illustrated as being located in computing device 212, embodiments of the present disclosure are not so limited. For example, memory 214 can also be located internal to another computing resource (e.g., enabling computer readable instructions to be downloaded over the Internet or another wired or wireless connection).

Figure 3:
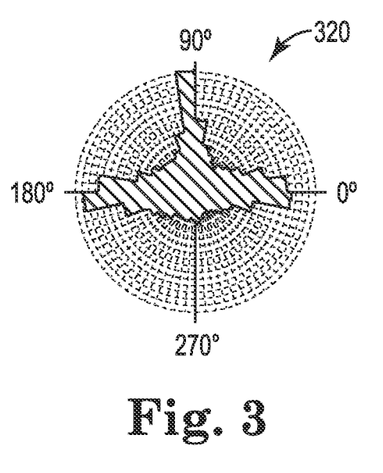
FIG. 3 illustrates a motion orientation histogram in accordance with one or more embodiments of the present disclosure.

FIG. 3 illustrates a motion orientation histogram 320 in accordance with one or more embodiments of the present disclosure. As previously discussed, and as shown in FIG. 3, motion orientation histogram 320 can include an orientation of each of a plurality of optical flow vectors represented by an angle between 0 and 360 degrees, for instance. As shown, the angles can be divided into histogram bins which may be defined by particular angles and/or intervals. Angles and/or intervals associated with histogram bins (e.g., 10 degrees) are not limited herein. A value (e.g., size and/or height) associated with a particular bin can correspond to a count (e.g., amount) of the optical flow vectors oriented at various angles on and/or between the boundaries of the bin.

Figure 4:
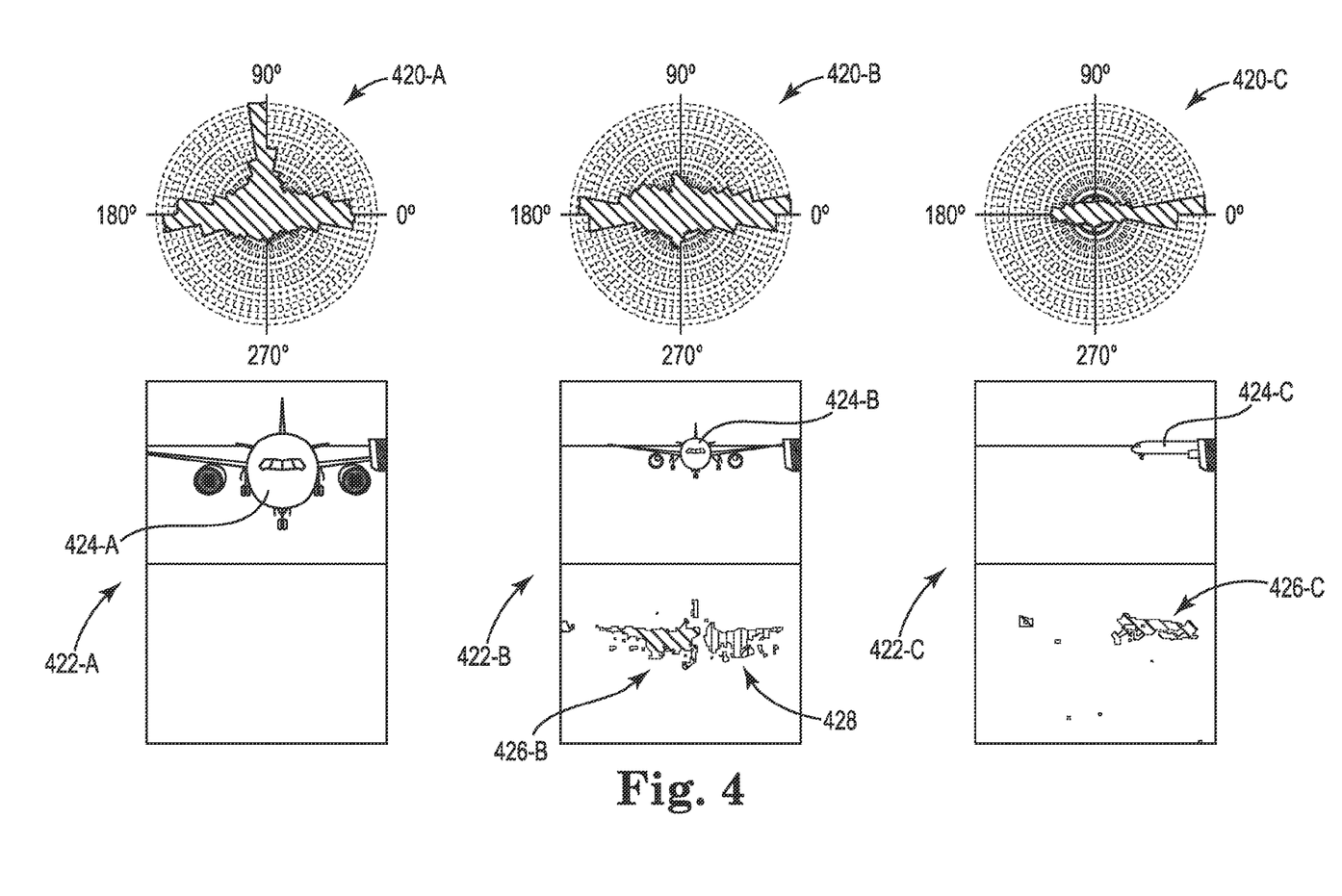
FIG. 4 illustrates a number of motion orientation histograms and motion flow maps associated with an aircraft during a pushback.

FIG. 4 illustrates a number of motion orientation histograms and motion flow maps associated with an aircraft during a pushback. The top portion of a window 422-A can be an image of an aircraft 424-A prior to pushback. Accordingly, the bottom portion of window 422-A (e.g., a motion flow map associated with the image) is substantially empty (e.g., illustrates no motion blob(s)). A motion orientation histogram 420-A associated with the image of aircraft 424-A illustrates optical flow vectors oriented at various angles. Such a motion orientation histogram can indicate a lack of motion, for instance, because values associated with particular bins and/or groups of bins (e.g., directions) may be substantially similar in value (e.g., size and/or height). That is, motion orientation histogram 420-A can indicate a lack of a dominant orientation angle of motion of aircraft 424-A.

The top portion of window 422-B can be an image of the aircraft 424-B while aircraft 424-B is being pushed back substantially straight away from an imaging device capturing the image. Accordingly, the bottom portion of window 422-B (e.g., a motion flow map associated with the image) includes two motion blobs. Motion blob 426-B can be a right motion blob and motion blob 428 can be a left motion blob. The display of left motion blob 426-B and right motion blob 428 can, for instance, indicate simultaneous left and right motion of portions (e.g., opposing portions) of aircraft 424-B. A motion orientation histogram 420-B associated with the image of the aircraft 424-B illustrates optical flow vectors oriented substantially at 180 degrees and substantially at 0 degrees (e.g., indicating simultaneous left and right directions of motion).

The top portion of window 422-C can be an image of the aircraft 424-C while aircraft 424-C is being pushed back to the right with respect to the image. Accordingly, the bottom portion of window 422-C (e.g., a motion flow map associated with the image) includes a motion blob 426-C indicating a right direction of motion. A motion orientation histogram 420-C illustrates optical flow vectors oriented substantially at 0 degrees (e.g., indicating a right direction of motion).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method of determining a pushback direction of an aircraft, comprising:
   receiving a video image of an aircraft during a pushback of the aircraft;
   determining a motion flow map associated with the video image during the pushback, wherein determining the motion flow map includes:
      grouping a first portion of optical flow vectors into a first motion blob associated with the aircraft;
      grouping a second portion of optical flow vectors into a second motion blob associated with the aircraft, wherein the second motion blob opposes the first motion blob;
   determining a motion orientation histogram associated with the video image during the pushback; and
   determining a direction of the pushback based on the motion flow map and the motion orientation histogram, wherein determining the direction includes determining a disappearance of one of the first motion blob and the second motion blob.

2. The method of claim 1, wherein the method includes receiving the video image on a number of pixels.

3. The method of claim 2, wherein the method includes determining the motion flow map using a portion of the number of pixels.

4. The method of claim 1, wherein the method includes determining a respective motion flow map associated with each of a number of frames of the video image.

5. The method of claim 1, wherein the method includes determining a respective motion orientation histogram associated with each of a number of frames of the video image.

6. The method of claim 1, wherein the method includes accumulating a determined motion of the aircraft over a particular time period.

7. The method of claim 1, wherein determining the motion flow map includes setting a buffer size associated with the video image based on historical pushback speed information.

8. The method of claim 1, wherein the method includes determining one of a first direction of pushback and a second direction of pushback, and wherein the first direction opposes the second direction.

9. A system for determining a pushback direction of an aircraft, comprising:
   a video camera to capture a video image of an aircraft during a pushback of the aircraft; and
   a computing device, having a processor configured to execute instructions to:
      receive the video image;
      determine a plurality of optical flow vectors associated with the video image of the aircraft;
      create a first mapping using the plurality of optical flow vectors, wherein the first mapping includes a first portion of the plurality of optical flow vectors oriented in a first direction as a first motion blob associated with the aircraft, and a second portion of the plurality of optical flow vectors oriented in a second direction as a second motion blob associated with the aircraft, wherein the second direction opposes the first direction;
      create a second mapping using the optical flow vectors, wherein the second mapping includes a distribution of the plurality of optical flow vectors into a plurality of radial histogram bins; and
      determine a direction of the pushback based on the first mapping and the second mapping, wherein determining the direction includes determining a disappearance of one of the first motion blob and the second motion blob.

10. The system of claim 9, wherein the processor is configured to execute instructions to embed past consecutive temporal information in a particular frame of the first mapping.

11. The system of claim 9, wherein the processor is configured to execute instructions to:
   display the first motion blob having a first color in the first mapping; and
   display the second motion blob having a second color in the first mapping.

12. The system of claim 9, wherein the processor is configured to execute instructions to:
   store the first portion of the plurality of the optical flow vectors as a first channel of the first mapping; and
   store the second portion of the plurality of the optical flow vectors as a second channel of the first mapping.

13. The system of claim 9, wherein the processor is configured to execute instructions to remove, from the first mapping, a portion of a number pixels associated with each of the first and second pluralities of the optical flow vectors that do not exceed a particular brightness threshold.

14. The system of claim 9, wherein the processor is configured to execute instructions to determine a value associated with each of a number of radial histogram bins of the second mapping.

15. The system of claim 14, wherein the processor is configured to execute instructions to determine a dominant orientation angle based on an accumulation of the values associated with each radial histogram bin of the second mapping over a particular time period.

16. The system of claim 9, wherein the processor is configured to execute instructions to determine the plurality of optical flow vectors associated with a particular frame of the video image with respect to a previous frame of the video image.

17. A non-transitory computer-readable medium storing instructions thereon executable by a processor to:
   determine a plurality of optical flow vectors from a video image including a number of frames of an aircraft during a pushback of the aircraft;
   group, over the number of frames, a first portion of the optical flow vectors indicating a right direction of pushback into a first motion blob associated with the aircraft;
   group, over the number of frames, a second portion of the optical flow vectors indicating a left direction of pushback into a second motion blob associated with the aircraft;
   determine a right confidence factor based on the first portion of the optical flow vectors;
   determine a left confidence factor based on the second portion of the optical flow vectors; and provide a notification indicating a determined direction of pushback responsive to one of the right confidence factor and the left confidence factor exceeding a threshold, wherein the one of the right confidence factor and the left confidence factor exceeding the threshold includes a disappearance of one of the first motion blob and the second motion blob.

18. The computer-readable medium of claim 17, wherein the instructions include instructions executable to provide the notification to a ramp controller.

19. The computer-readable medium of claim 17, wherein the instructions include instructions executable to provide the notification responsive to a stabilization of a size associated with one of the first motion blob and the second motion blob over a particular portion of the number of frames.

* * * * *